United States Patent
Coppock et al.

(10) Patent No.: US 8,765,829 B2
(45) Date of Patent: Jul. 1, 2014

(54) PHENOLIC FOAM

(75) Inventors: Vincent Coppock, Chesire (GB); Ruud Zeggelaar, Arnhem (NL); Hiroo Takahashi, Funabashi (JP); Toshiyuku Kato, Fujimino (JP)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 0 days.

(21) Appl. No.: 13/486,246

(22) Filed: Jun. 1, 2012

(65) Prior Publication Data
US 2013/0072589 A1 Mar. 21, 2013

Related U.S. Application Data

(63) Continuation of application No. 11/991,534, filed as application No. PCT/IE2006/000097 on Sep. 8, 2006, now abandoned, which is a continuation of application No. PCT/IE2005/000092, filed on Sep. 8, 2005.

(30) Foreign Application Priority Data

Sep. 8, 2005 (IE) .................... PCT/IE2005/000092

(51) Int. Cl.
C08J 9/00 (2006.01)
C08J 9/14 (2006.01)
C08G 8/00 (2006.01)
C08G 8/04 (2006.01)
C08G 8/10 (2006.01)

(52) U.S. Cl.
USPC ............ 521/181; 521/180; 521/136; 521/92; 521/97

(58) Field of Classification Search
USPC ................... 521/180, 181, 136, 97
See application file for complete search history.

(56) References Cited

U.S. PATENT DOCUMENTS

| | | | |
|---|---|---|---|
| 2,744,875 A | 5/1956 | Thomas et al. | |
| 3,389,094 A | 6/1968 | D'Alessandro | |
| 4,207,400 A | 6/1980 | Dahms | |
| 4,281,069 A | 7/1981 | Harris | |
| 4,418,158 A * | 11/1983 | Frentzel | 521/115 |
| 4,478,958 A | 10/1984 | Carlson | |
| 4,525,492 A * | 6/1985 | Rastall et al. | 521/181 |
| 4,546,119 A | 10/1985 | Lunt | |
| 5,137,931 A | 8/1992 | Okumura | |
| 5,616,626 A | 4/1997 | Rader | |
| 2006/0254164 A1 | 11/2006 | Ueda | |

FOREIGN PATENT DOCUMENTS

| | | | | |
|---|---|---|---|---|
| BE | 825077 | 7/1975 | | |
| EP | 0579321 | 1/1994 | | |
| EP | 1095970 | 5/2001 | | |
| FR | 15820196 | 9/1969 | | |
| FR | 2124185 | 9/1972 | | |
| GB | 758562 | 10/1956 | | |
| GB | 1455667 | 11/1976 | | |
| GB | 2024226 | 1/1980 | | |
| GB | 2024227 | 1/1980 | | |
| GB | 2024227 A * | 1/1980 | | C08J 9/04 |
| JP | 50-82315 | 11/1973 | | |
| JP | 06-179766 | 6/1994 | | |
| JP | 08-053563 | 2/1996 | | |
| JP | 2005/120337 | 5/2005 | | |
| JP | 2005-120337 | 5/2005 | | |
| WO | 2004/063257 | 7/2004 | | |
| WO | 2004/104350 | 12/2004 | | |
| WO | 2006/114777 | 11/2006 | | |
| WO | WO 2006114776 A1 * | 11/2006 | | C08J 9/18 |

OTHER PUBLICATIONS

"Solubility Product Constants," Eni Generalic. 2003.
"Handbook of Plastic Foams: Types, Properties, Manufacture and Applications," Edited by Arthur Landrock, 1995, pp. 21, 23 and 183-219.

* cited by examiner

*Primary Examiner* — Kara Boyle
(74) *Attorney, Agent, or Firm* — Jacobson Holman PLLC

(57) ABSTRACT

A phenolic foam is made by foaming and curing a foamable phenolic resin composition that comprises a phenolic resin, a blowing agent, an acid catalyst and an inorganic filler. The blowing agent comprises an aliphatic hydrocarbon containing from 1 to 8 carbon atoms and the inorganic filler is at least one selected from a metal hydroxide, a metal oxide, a metal carbonate and a metal powder. The phenolic foam has a pH of 5 or more. The phenolic foam has a higher pH value compared with conventional phenolic foam and reduces corrosion risk when in contact with metallic materials. The phenolic foam maintains excellent long-term stable thermal insulation performance, low water uptake and fire resistance performance and by using a hydrocarbon blowing agent, does not harm the environment as an ozone depleting or global warming material.

29 Claims, No Drawings

PHENOLIC FOAM

This application is a Continuation Application of U.S. patent application Ser. No. 11/991,534, filed Sep. 2, 2009, which is a national stage of International Application No. PCT/IE06/000097 filed Sep. 8, 2006 which claims priority to International Application No. PCT/IE05/000092 filed Sep. 8, 2005, which is incorporated by reference herein.

INTRODUCTION

Phenolic foam is used in insulation applications for construction materials because of its superior thermal insulation and fire resistance characteristics.

It is known that the thermal conductivity of polymeric thermal insulation materials including phenolic foam can change with time. This phenomenon is caused by the gradual diffusion out of gas from inside the foam cells. The gas present inside the foam cells is the blowing agent used in the foaming process. The gas in the foam cells is slowly replaced by air from the atmosphere. As a result, the thermal conductivity of phenolic foam can increase with time.

It is highly desirable to achieve long-term stability for the thermal insulation performance of phenolic foam products. It is believed that one of the causes for the degradation of thermal insulation performance is the reduction in the flexibility of the cell walls of phenolic foam with time. Therefore, an object of the present invention is to impart flexibility to the cell walls and thereby maintain closed cell structure in the phenolic foam. Stable closed cell structure provides a means for maintaining stable thermal conductivity for the phenolic foam over an extended time period.

As phenolic foam contains an acid catalyst, upon exposure to water such as rain, the acid catalyst may be extracted from the phenolic foam by such water. This could cause a problem when metallic materials are in contact with the phenolic foam, as metals could be susceptible to corrosion.

Accordingly, an object of the invention is to provide phenolic foam that has excellent thermal insulation performance, yet also has a higher pH value when compared to conventional phenolic foam. Such a phenolic foam when in contact with metal would have significantly reduced potential to induce metallic corrosion.

It is a further objective to use a blowing agent that does not harm the environment.

STATEMENTS OF INVENTION

According to the invention there is provided a phenolic foam made by foaming and curing a foamable phenolic resin composition that comprises a phenolic resin, a blowing agent, an acid catalyst and an inorganic filler characterised in that the blowing agent comprises an aliphatic hydrocarbon containing from 1 to 8 carbon atoms, the inorganic filler is at least one selected from a metal hydroxide, a metal oxide, a metal carbonate and a metal powder and in that the phenolic foam has a pH of 5 or more.

In one embodiment the phenolic resin has a molar ratio of phenol groups to aldehyde groups in the range 1:1 to 1:3, preferably from 1.5 to 2.3.

In one embodiment the phenolic resin has a weight average molecular weight of from 400 to 3,000, preferably from 700 to 2,000.

In one embodiment the aliphatic hydrocarbon blowing agent comprises 1 to 20 parts by weight per 100 parts by weight of phenolic resin.

The blowing agent may comprise at least one of butane, pentane, hexane, heptane and isomers thereof. The blowing agent may comprise cyclopentane and at least one hydrocarbon of isobutane and, isopentane. In one case the blowing agent comprises 75% or more of cyclopentane. The blowing agent may comprise 25% or less of at least one hydrocarbon of isobutane and isopentane.

In one embodiment the acid catalyst comprises 5 to 25 parts by weight per 100 parts by weight of phenolic resin. The acid catalyst may comprise at least one of benzenesulphonic acid, para-toluenesulphonic acid, xylenesulphonic, naphthalenesulphonic acid, ethylbenzenesulphonic acid and phenolsulphonic acid.

In one embodiment the inorganic filler is present in an amount of from 1 to 20 parts by weight per 100 parts by weight of phenolic resin.

In one embodiment the filler comprises at least one of a metal oxide such as aluminium oxide or zinc oxide, a metal powder such as zinc, or a metal hydroxide such as aluminium hydroxide, magnesium hydroxide, or a metal carbonate such as calcium carbonate, magnesium carbonate, barium carbonate, zinc carbonate. Preferably the filler may comprise at least one of a metal hydroxide such as aluminium hydroxide, magnesium hydroxide, or a metal carbonate such as calcium carbonate, magnesium carbonate, barium carbonate, zinc carbonate with an ionic Equilibrium Solubility Constant, (Ksp) lower than $10^{-8}$ measured at 25° C.

In a preferred embodiment the filler comprises a metal carbonate such as calcium carbonate, barium carbonate, or zinc carbonate. Foams of particularly good quality have been produced using calcium carbonate as the sole filler.

In one embodiment the foam comprises a plasticiser for the phenolic resin. The plasticiser may comprise 0.1 to 20 parts by weight per 100 parts by weight of phenolic resin. The plasticiser may comprise a polyester polyol that is the reaction product of a polybasic carboxylic acid selected from a dibasic to a tetrabasic carboxylic acid with a polyhydric alcohol selected from a dihydric to a pentahydric alcohol. Preferably the polyester polyol has a number average molecular weight of 250 to 350 and a weight average molecular weight of 400 to 550.

One embodiment the polybasic carboxylic acid used to synthesise the polyester polyol comprises at least one of phthalic acid, isophthalic acid, terephthalic acid, naphthalene-2,3-dicarboxylic acid, naphthalene-1,4-dicarboxylic acid, napthalene-2,6-dicarboxylic acid, adipic acid, pimeric acid, suberic acid, azelaic acid, sebacic acid, cyclohexane-1,2-dicarboxylic acid, cyclohexane-1,3-dicarboxylic acid, and cyclohexane-1,4-dicarboxylic acid. Preferably, the polybasic carboxylic acid used to synthesise the polyester polyol comprises one or more of phthalic acid, isophthalic acid, or terephthalic acid.

In one embodiment the polyhydric alcohol used to synthesise the polyester polyol comprises at least one of ethylene glycol, diethylene glycol, propylene glycol, dipropylene glycol, 1,4-butane diol, 1,5-pentane diol, 1,6-hexane diol, neopentyl glycol, 1,2-cyclohexane dimethanol, 1,3-cyclohexane dimethanol, and 1,4-cyclohexane dimethanol. Preferably, the polyhydric alcohol used to synthesise the polyester polyol comprises one or more of diethylene glycol, propylene glycol, dipropylene glycol, 1,4-butane diol.

The phenolic foam of the invention may comprise a surfactant for the phenolic resin.

The surfactant may comprise 1 to 6 parts by weight per 100 parts by weight of phenolic resin.

The surfactant may be a castor oil-ethylene oxide adduct wherein more than 20 moles but less than 40 moles of ethylene oxide are added per 1 mole of castor oil.

In another embodiment the foam comprises an organic modifier for co-reacting with the phenolic resin. The modifier may comprise 1 to 10 parts by weight of a compound having an amino group per 100 parts by weight of phenolic resin. In one case at least one amino group containing compound is selected from urea, dicyandiamide and melamine.

The phenolic foam has an aged thermal conductivity of 0.025 W/m·K or less when measured at a mean temperature of 10° C. after heat ageing for 175±5 days at 70±2° C., in accordance with the procedure as specified in European Standard EN13166:2001, Annex C, section C.4.2.3.

The phenolic foam may have a density of from 10 to 100, preferably, from 10 to 45 kg/m$^3$.

The phenolic foam may have a closed cell content of 85% or more, and a limiting oxygen index of 30% or more.

In a preferred embodiment the foam has a moisture uptake of less than 0.9 kg/m$^2$, most preferably a moisture uptake of less than 0.8 kg/m$^2$.

In one embodiment the phenolic foam has a facing on at least one surface thereof.

The facing may comprise at least one of glass fibre-non woven fabric, spun bonded-non woven fabric, aluminum foil, bonded-non woven fabric, metal sheet, metal foil, ply wood, calcium silicate-board, plaster board, Kraft or other paper product, and wooden board.

DETAILED DESCRIPTION

The invention will be more clearly understood from the following description thereof given by way of example only.

The phenolic foam comprises phenolic resin, hydrocarbon blowing agent, an acid catalyst and an inorganic filler to regulate foam pH. The invention provides phenolic foam with a higher pH value than is currently typical of commercially available phenolic foam products. The higher pH helps prevent metallic materials from corroding when they are in prolonged contact with phenolic foam.

A preferred type of phenolic resin to use in the present invention is a resole resin. This resole resin can be obtained from the chemical reaction of phenol or a phenol based compound such as cresol, xylenol, para-alkylphenol, para-phenylphenol, resorcinol, and the like with an aldehyde such as formaldehyde, furfural, acetaldehyde and the like under a catalytic amount of alkali such as sodium hydroxide, potassium hydroxide, calcium hydroxide, or an aliphatic amine like trimethylamine, or triethylamine. These types of chemical constituent are commonly used in standard resole resin production, but the invention is not limited to just those chemicals listed here.

The molar ratio of phenol groups to aldehyde groups is not especially limited. It is preferred that the molar ratio of phenol to aldehyde is in the range from 1:1 to 1:3, more preferably from 1:1.5 to 1:2.5, and particularly preferable is 1:1.6 to 1:2.1.

A preferred weight average molecular weight suitable for the phenolic resin used in the invention is from 400 to 3,000, and more preferably from 700 to 2,000. The number average molecular weight is preferably from 150 to 1,000, and more preferably from 300 to 700.

An aliphatic hydrocarbon or mixtures of aliphatic hydrocarbons having from 1 to 8 carbon atoms is employed as the blowing agent in the present invention. It includes normal chain or branched chain aliphatic hydrocarbons. Examples include butane, pentane, hexane, heptane and their isomers. Hydrocarbons have low potential for global warming and do not deplete the ozone layer of the Earth.

The amount of the blowing agent used in the present invention is from 1 to 20 parts by weight relative to 100 parts by weight of phenolic resin, more preferably from 5 to 10 parts by weight per 100 parts by weight of phenolic resin.

The addition of inorganic filler to the phenolic foam of the present invention reduces residual acidity, and can improve fire performance whilst still maintaining low thermal conductivity.

The amount of inorganic filler used is preferably from 0.1 to 30 parts by weight, and more preferably, from 1 to 10 parts by weight relative to 100 parts by weight of phenolic resin. The fillers that can be added include metal hydroxides such as aluminium hydroxide, magnesium hydroxide; metal carbonates such as calcium carbonate, magnesium carbonate, barium carbonate, zinc carbonate and so on; with an ionic Equilibrium Solubility Constant, (Ksp), of less than $10^{-8}$. The filler of the present invention may be used either alone or in combination with one or more other fillers.

The use of an organic amino group containing compound, such as urea, in the foam of the present invention, can lower thermal conductivity, increase strength and reduce friability of the phenolic foam. A preferred amount of urea to be used in the present invention is in the range from 1 to 10 parts by weight, preferably, from 3 to 7 parts by weight relative to 100 parts by weight of the phenolic resin.

For the acid catalyst used to initiate polymerisation of the phenolic resin in the invention, individual or blends of strong organic acids such as benzene sulphonic acid, para toluene sulphonic acid, xylene sulfonic acid, ethyl benzene sulphonic acid, naphthalene sulphonic acid, phenol sulphonic acid, and the like are used. Phenol sulphonic acid, para toluene sulphonic acid, and xylene sulphonic acid are particularly preferred. An inorganic acid such as sulphuric acid, phosphoric acid and the like, may be optionally used with the said organic acids.

The amount of acid used to initiate polymerisation of the phenolic resin varies with the type of acid selected, but is usually in a range from 5 to 25 parts by weight, and more preferably from 7 to 22 parts by weight relative to 100 parts by weight of phenolic resin. The most preferable amount of acid to use is from 10 to 20 parts by weight of phenolic resin.

The phenolic resin used herein contains a surfactant to aid foam manufacture. The surfactant used is a castor oil-ethylene oxide adduct wherein more than 20 moles but less than 40 moles of ethylene oxide are added per mole of castor oil. The weight addition of the castor oil-EO adduct relative to 100 parts by weight of phenolic resin is preferably from 1 to 5 parts by weight, and more preferably from 2 to 4 parts by weight. If the content of the castor oil-EO adduct is less than 1 part by weight, uniform foam cells cannot be obtained. On the other hand, if more than 5 parts by weight of the castor oil-EO adduct is used, product cost and the water-absorption capacity of the foam is increased.

In accordance with the present invention, there is provided a plasticiser for the phenolic foam. A polyester polyol is the preferred plasticiser. The plasticiser imparts flexibility to the cell walls of the phenolic foam, inhibits their degradation over time, and improves long term thermal insulation stability. The plasticiser of the present invention is a polyester polyol that is obtained from the reaction of a polybasic carboxylic acid with a polyhydric alcohol. In terms of imparting flexibility to the cell-walls of phenolic foam, the molecular weight of the plasticiser is not especially limited. However, a polyester polyol having a weight average molecular weight from 200 to 10,000, and particularly from 400 to 550, is preferred.

The polyhydric alcohol used preferably has at least two hydroxyl groups in a molecule. The number of hydroxyl groups in a molecule of the polyhydric alcohol used is at least more than 1.

The number of carboxyl groups in a molecule of the said polybasic carboxylic acid is at least more than 1.

The polyester polyol of the present invention is for example, the reaction product of a polybasic carboxylic acid selected from a dibasic to a tetrabasic carboxylic acid with a polyhydric alcohol selected from a dihydric to a pentahydric alcohol. A product expressed in the Formula (I) below is preferable, wherein A is a dicarboxylic acid residue originally containing up to two hydrogen atoms from a dibasic carboxylic acid, and R is a chemical backbone of a dihydric alcohol originally containing up to two hydroxyl groups from a dihydric alcohol, and n is an integer equal to or more than 1.

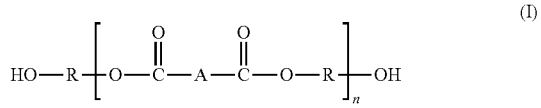

In the general formula (I), a preferred dibasic carboxylic acid forming the residue A is either an aromatic dicarboxylic acid, an aliphatic dicarboxylic acid or an alicyclic dicarboxylic acid. These carboxylic acids preferably include phthalic acid, isophthalic acid, terephthalic acid, naphthalene-2,3-dicarboxylic acid, naphthalene-1,4-dicarboxylic acid, naphthalene-2,6-dicarboxylic acid, adipic acid, pimeric acid, suberic acid, azelaic acid, sebacic acid, cyclohexane-1,2-dicarboxylic acid, cyclohexane-1,3-dicarboxylic acid, cyclohexane-1,4-dicarboxylic acid and the like.

The dihydric alcohol forming chemical backbone R is an aromatic glycol, an aliphatic glycol or an alicyclic glycol which preferably includes ethylene glycol, diethylene glycol, propylene glycol, dipropylene glycol, 1,4-butane diol, 1,5-pentane diol, 1,6-hexane diol, neopentyl glycol, 1,2-cyclohexane dimethanol, 1,3-cyclohexane dimethanol, and 1,4-cyclohexane dimethanol, cyclopentane-1,2-diol, cyclopentane-1,2-dimethanol, cyclohexane-1,2-diol, cyclohexane-1,3-diol, cyclohexane-1,4-diol, cyclopentane-1,4-dimethanol, 2,5-norbornane diol and the like. Aliphatic glycols and alicyclic glycols are especially preferable.

A reaction product so obtained is a mixture in which "n" is composed of various values and the hydroxyl value of these reaction products is usually included in a range of from 10 to 500 mg-KOH/g.

Since the plasticiser for the phenolic foam in the present invention has a molecular structure containing both an ester backbone and a hydroxyl group, it is hydrophilic as is the phenolic resin. Therefore the phenolic resin and the plasticiser are compatible and so together can form a homogeneous resin solution. Furthermore, it is presumed that when the said polyester polyol, is added to a foamable phenolic resin composition, the polyester polyol imparts flexibility to the cell-walls of the phenolic foam. Therefore, even after extensive ageing, degradation phenomenon such as a crack-occurrence at the cell-walls is controlled. This leads to long-term stability for the thermal conductivity of the phenolic foam.

The phenolic foam of the present invention has an aged thermal conductivity below 0.025 W/m·K. Phenolic foam that has an aged thermal conductivity more than 0.025 W/m·K is less efficient in terms of thermal insulation performance.

The surface of the phenolic foam products of the present invention may be covered with a facing material. Surface facing materials include non-woven fabrics made of natural fibre, synthetic fibre or inorganic fibre. Paper or kraft paper, aluminium foil and so on can be used as facing material.

A process for producing phenolic foam of the invention with a pH above 5.0 is described that uses a phenolic resin composition that contains phenolic resin, an acid catalyst, hydrocarbon blowing agent and an inorganic filler to raise the pH of the foam. The phenolic resin used could also contain plasticiser, surfactant, and a chemical compound having amino groups. The hydrocarbon blowing agent and acid catalyst used are generally added to the phenolic resin composition in a foam mixing head at the time of foam manufacture.

As stated, to the resin composition used in producing phenolic foam of the present invention, is added an amino group containing compound. This is preferably urea that is mixed into the phenolic resin at 18° C. to 22° C. for at least 1 to 5 hours prior to making foam. Alternatively an amino group containing compound can be reacted with formaldehyde in the presence of phenol during the manufacture of the phenolic resin.

Castor oil-EO adduct surfactant, an inorganic filler such as calcium carbonate powder with mean particle size 5 to 200 μm, and preferably, a polyester polyol plasticiser are also mixed into the phenolic resin.

The phenolic resin composition obtained is pumped to a high speed mixer head where it is introduced to and mixed in with hydrocarbon blowing agent and an acid catalyst to prepare a foamable phenolic composition.

According to the process for producing phenolic foam of the present invention, the said foamable phenolic resin composition is discharged on to a continuous running facing material carrier and passed through a heated zone for foaming and moulding into phenolic foam products of predetermined shape. In this manufacturing process, the said resin composition that has been discharged on to a running facing material carrier on a conveyor belt passes into a heated oven typically at 50 to 100° C. for approximately 2 to 15 minutes. The top surface of the rising foam composition is pressed down with another facing material carried on an upper conveyer belt. The thickness of the foam is controlled to the required predetermined thickness. The phenolic foam leaving the oven is then cut to a predetermined length.

The use of an aliphatic hydrocarbon blowing agent containing from 1 to 8 carbon atoms is environmentally friendly but still allows closed cell phenolic foam to be produced, thereby maintaining thermal insulation performance. The phenolic foam in the present invention comprises foaming and curing a foamable phenolic resin composition comprising a phenolic resin, an acid catalyst, hydrocarbon blowing agent and an inorganic filler.

In accordance with the present invention, corrosion-resistant, phenolic foam is provided by using a an aliphatic hydrocarbon blowing agent containing 1 to 8 carbon atoms, and additionally controlling the amount of acid catalyst and adding an inorganic filler such as calcium carbonate to the foam. The phenolic foam produced has excellent fire resistance performance, long-term thermal insulation performance stability, low water uptake and a higher pH value than is normally obtained with phenolic foam products. Further the blowing agent used has favourable properties regarding global warming potential and ozone depletion.

The invention described herein overcomes the potential corrosion risk to metal in contact with phenolic foam by providing a means of partially neutralising the residual acid in the phenolic foam by using an inorganic filler.

The phenolic foam of the present invention has a pH of 5.0 or more. If the pH is 5.0 or more, the corrosion of metal can be inhibited when in contact with or adjacent to the said phenolic foam even when the metal is wet. A preferable pH for the phenolic foam of the invention is 5.5 or more and especially preferable is when pH is 6.0 or more. The method for the determination of pH is described later.

The phenolic foam of the present invention has an aged thermal conductivity of below 0.025 W/m·K. The aged thermal conductivity is measured after exposing foam samples for 25 weeks at 70° C. and stabilisation to constant weight at 23° C. and 50% R.H. This thermal ageing serves to provide an estimated thermal conductivity for a time period of 25 years at ambient temperature. The thermal insulation performance of phenolic foam with a thermal conductivity above 0.025 W/m·K is undesirable regarding insulation performance.

The phenolic foam in the present invention has typically a density of 10 to 45 kg/m³, and an average cell diameter of 5 to 400 μm.

The phenolic foam of the present invention has substantially no holes in the cell-walls.

The phenolic foam of the present invention has a closed cell content of 90% or more, more preferably 92.5% or more.

The phenolic foam in the present invention has preferably an oxygen index of 29 or more, and more preferably, 30 or more.

The long-term stability of the phenolic foam cells is maintained because the phenolic foam cells of the present invention have improved flexibility.

Suitable testing methods for measuring the physical properties of phenolic foam are described below.

(1) Foam Density

This was measured according to EN 1602: Thermal insulating products for building applications—Determination of the apparent density (2) Thermal Conductivity A foam test piece of length 300 mm and width 300 mm was placed between a high temperature plate at 20° C. and a low temperature plate at 0° C. in a thermal conductivity test instrument (LaserComp Type FOX314/ASF, Inventech Benelux BV). The thermal conductivity (TC) of the test pieces was measured according to EN 12667: Thermal performance of building materials and products—Determination of thermal resistance by means of guarded hot plate and heat flow meter methods, Products of high and medium thermal resistance.

(3) Thermal Conductivity after Accelerated Ageing

This was measured using EN 13166: Thermal insulation products for buildings—Factory made products of phenolic foam (PF)—Specification Annex C section.4.2.3. The thermal conductivity is measured after exposing foam samples for 25 weeks at 70° C. and stabilisation to constant weight at 23° C. and 50% R.H. This thermal ageing serves to provide an estimated thermal conductivity for a time period of 25 years at ambient temperature.

(4) pH 0.5 g of phenolic foam is pulverised to pass through a 250 μm (60 mesh) sieve and is then put into a 200 ml-Erlenmeyer flask. 200 ml of distilled water are added and the contents are sealed with a stopper. After stirring at 23±5 for 7 days with a magnetic follower, the contents of the flask are tested for pH.

(5) Average Cell Diameter

A flat section of foam is obtained by slicing through the middle section of the thickness of the foam board in a direction running parallel to the top and bottom faces of a foam board. A 50-fold enlarged photocopy is taken of the cut cross section of the foam. Four straight lines of length 9 cm are drawn on to the photocopy. The number of cells present on every line is counted and the average number cell number determined according to JIS K6402 test method. The average cell diameter is taken as 1800 μm divided by this average number.

(6) Voids

A flat section of foam is obtained by slicing through the middle section of the thickness of the foam board in a direction running parallel to the top and bottom faces. A 200-fold enlarged photocopy is taken of this cut cross section of foam covering an area 100 mm by 150 mm. A transparent graph paper is placed on top of the photocopy of the cut foam section. The area of voids that occupy 8 or more 1 mm by 1 mm squares of graph paper was added up to calculate the voids area ratio. Eight squares is equivalent to 2 mm² area of actual foam.

(7) Oxygen Index

The oxygen index at room temperature of phenol foam was determined according to JIS K7201-2 test method.

(8) Closed Cell Ratio

The closed cell ratio was determined according to ASTM D2856 test method.

(9) Water Uptake

The water uptake was determined according to EN1609: 1996 Thermal Insulating products for building applications—Determination of short term water absorption by partial immersion.

(10) Friability

Friability is measured according test method ASTM C 421-88.

The present invention is explained in detail by the Examples and Comparative Examples that follow. The physical properties of the phenolic foams obtained are shown in Table 1 below. However, the invention is not limited only to these Examples and Comparative Example.

EXAMPLES

The phenolic resole resin used in the invention is Resin A and is described as follows.

Phenolic Resin A is a commercially available liquid Phenol Formaldehyde resin supplied by Sumitomo Bakelite under the trade name R300.

This resin has a viscosity of 8000-10000 cp at 25° C., weight average molecular weight 800 to 1200 and pH is 5.3 to 6.3.

R300 resin contains from 2% to 4% free phenol and 3% to 4% free formaldehyde. R300 resin has a Phenol:Formaldehyde molar ratio of 1:2.0 and has a water content of 11-13% (as measured by Karl Fisher analysis). To the R300 Resin is also added 2 to 5% surfactant, as has been described previously herein, The following Example 1 shows how foam samples of the invention are made.

Example 1

104 parts by weight (pbw) of Resin A at 20° C. is mixed with 5 pbw of powdered urea and 5 pbw of plasticiser. The resin is allowed to stand for 1 hour at 20 C. Next is added 5.3 pbw of calcium carbonate (Durcal 130 from Omya), with average particle size 170 μm. The resin is mixed at 300 rpm until calcium carbonate is uniformly dispersed. Resin A, (containing urea and calcium carbonate filler), is then cooled to between 17° C. and 21° C. The said phenolic resin mixture is pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Example 2

Here there is a Reduced Amount of Plasticiser 2.5 Parts Per Weight Instead of 5 Parts Per Weight 104 parts by weight (pbw) of Resin A at 20° C. is mixed with 5 pbw of powdered urea and 2.5 pbw of plasticiser. The resin is allowed to stand for 1 hour at 20 C. Next is added 5.3 pbw of calcium carbonate, (Durcal 130 from Omya). The resin is mixed at 300 rpm until calcium carbonate is uniformly dispersed. Resin A, (containing urea and calcium carbonate filler), is then cooled to between 17° C. and 21° C. The said phenolic resin mixture is pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Example 3

Here there is a Reduced Amount of Urea 2.5 Parts Per Weight Instead of 5 Parts Per Weight 104 parts by weight (pbw) of Resin A at 20° C. is mixed with 2.5 pbw of powdered urea and 5 pbw of plasticiser. The resin is allowed to stand for 1 hour at 20 C. Next is added 5.3 pbw of calcium carbonate (Durcal 130 from Omya). The resin is mixed at 300 rpm until calcium carbonate is uniformly dispersed. Resin A, (containing urea and calcium carbonate filler), is then cooled to between 17° C. and 21° C. The said phenolic resin mixture is pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Comparative Example 1

The following comparative example describes the manufacture of a foam without calcium carbonate filler.

104 parts by weight (pbw) of Resin A at 20° C. is mixed with 5 pbw of powdered urea and 5 pbw of plasticiser. The resin is allowed to stand for 1 hour at 20 C. Resin A containing urea is then cooled to between 17° C. and 21° C. The said phenolic resin mixture was pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Comparative Example 1 demonstrates that a good quality phenolic insulation foam can be produced without the filler present, but the resulting foam shows a pH<5.0 and a water uptake >1.0 kg/m$^2$ when tested to test methods (4) and (9) as given above (see Table 1)

Comparative Example 2

The following comparative example describes the manufacture of a foam with magnesium carbonate filler.

104 parts by weight (pbw) of Resin A at 20° C. is mixed with 5 pbw of powdered urea and 5 pbw of plasticiser. The resin is allowed to stand for 1 hour at 20 C. Next is added 5.3 pbw of magnesium carbonate. (Sigma Aldrich product M7179), The resin is mixed at 300 rpm until magnesium carbonate is uniformly dispersed. Resin A, (containing urea and magnesium carbonate filler), is then cooled to between 17° C. and 21° C. The said phenolic resin mixture was pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Comparative Example 2 demonstrates that use of a filler with a high solubility parameter (Ksp>1×10$^4$) can produce a foam, but the resulting foam shows a water uptake >1.0 kg/m$^2$ when tested to test method (9), and poorer foam structure caused by reaction of the filler with the acid catalyst which results in higher thermal conductivity (see Table 1).

Comparative Example 3

The following comparative example describes the manufacture of a foam without plasticiser.

104 parts by weight (pbw) of Resin A at 20° C. is mixed with 5 pbw of powdered urea. The resin is allowed to stand for 1 hour at 20 C. Next is added 5.3 pbw of calcium carbonate (Durcal 130 from Omya). The resin is mixed at 300 rpm until calcium carbonate is uniformly dispersed. Resin A, (containing urea and calcium carbonate filler), is then cooled to between 17° C. and 21° C. The said phenolic resin mixture was pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Comparative Example 3 demonstrates that the absence of plasticiser results in a foam with poorer cell structure which results in higher aged thermal conductivity performance (see Table 1).

Comparative Example 4

The following comparative example describes the manufacture of a foam without urea.

104 parts by weight (pbw) of Resin A at 20° C. is mixed with 5 pbw of plasticiser. The resin is allowed to stand for 1 hour at 20 C. Next is added 5.3 pbw of calcium carbonate (Durcal 130 from Omya). The resin is mixed at 300 rpm until calcium carbonate is uniformly dispersed. Resin A, (containing calcium carbonate filler), is then cooled to between 17° C. and 21° C. The said phenolic resin mixture was pumped to a high speed peg mixer where 9 parts by weight of cyclopentane/isopentane (85/15 by weight) is added as blowing agent, and 20 parts by weight liquid para-toluene sulphonic acid/xylene sulphonic acid blend (65/35 w/w) at 92% concentration is added as catalyst. In the peg mixer, intimate mixing is achieved to give a foamable phenolic resin composition. The resin composition is discharged on to the lower non woven mat facing material which is carried on a running conveyor into a foam lamination machine. A top facing material is also introduced on to the foaming resin composition. The running foam material is passed through a curing oven press where the foam material is pressurised at 40 to 50 kPa to achieve a predetermined thickness of 50 mm. The blowing and curing of the foam material in the oven is carried out at a temperature from 65 to 75° C. for between 3 and 8 minutes. The phenolic foam that exits from the curing oven is cut to a predetermined length.

The foam board is then post-cured in an oven for 12 hours at 80° C. The foam board produced has an apparent density of 39.5 kg/m3.

Comparative Example 4 demonstrates that the absence of urea results in a foam with poorer cell structure which results in higher aged thermal conductivity performance (see Table 1).

Foam samples from the Examples and Comparative Examples are thermally aged at 70° C. for 25 weeks. After the ageing these samples are conditioned to constant weight at 23° C. and 50% RH. This thermal ageing simulates the expected changes in thermal conductivity that may be expected after 25 years at ambient conditions. This is a standard ageing period for assessing foam products for insulation applications.

TABLE 1

| | Density (kg/m$^3$) | Thermal Conductivity (W/m · K) at 10° C.) | Thermal Conductivity After 25 weeks at 70° C. + 5 weeks at 23° C. and 50% RH (W/m · K at 10° C.) | pH | Average Cell Diameter (μm) | Voids (%) | Oxygen Index (%) | Water uptake (kg/m$^2$) | Friability (%) | Closed Cell Ratio (%) |
|---|---|---|---|---|---|---|---|---|---|---|
| Ex 1 | 39.5 | 0.02141 | 0.02291 | 5.5 | 50 | 0.50 | 33.0 | 0.82 | 26 | 91 |
| Ex 2 | 38.8 | 0.02196 | 0.02306 | 6.1 | 65 | 0.62 | 31.0 | 0.75 | 29 | 92 |
| Ex 3 | 39.4 | 0.02181 | 0.02459 | 5.8 | 53 | 0.59 | 32.0 | 0.61 | 25 | 92 |
| C. Ex. 1 | 39.9 | 0.02160 | 0.02239 | 2.7 | 50 | 0.50 | 32.0 | 1.33 | 22 | 92 |
| C. Ex. 2 | 38.7 | 0.02873 | 0.02873 | 5.7 | 64 | 0.55 | 31.0 | 1.05 | 28 | 91 |
| C. Ex. 3 | 38.9 | 0.02901 | 0.02901 | 5.9 | 55 | 0.67 | 33.0 | 0.85 | 30 | 91 |
| C. Ex. 4 | 39.1 | 0.03123 | 0.03123 | 5.6 | 60 | 0.80 | 32.0 | 0.90 | 32 | 90 |

The foam sample from Comparative Example 2 where magnesium carbonate has been used results in an acceptable pH value. The water uptake of the foam sample with magnesium carbonate however is higher compared to the water uptake of the foam sample with calcium carbonate.

| Compound | Formula | $K_{SP}$ (at 25° C.) |
|---|---|---|
| lithium carbonate | $Li_2CO_3$ | $2.5 * 10^{-4}$ |
| magnesium carbonate | $MgCO_3$ | $3.8 * 10^{-8}$ |
| calcium carbonate (calcite) | $CaCO_3$ | $3.8 * 10^{-9}$ |
| barium carbonate | $BaCO_3$ | $5.1 * 10^{-9}$ |

Ionic compounds normally dissociate into their constituent ions when they dissolve in water. For example calcium carbonate:

$$CaCO_3(s) \rightleftarrows Ca^{2+}(aq) + CO_3^{2-}(aq)$$

The equilibrium expression is:

$$K_c = \frac{[Ca^{2+}(aq)][CO_3^{2-}(aq)]}{\{CaCO_3(s)\}}$$

Where Kc is called the equilibrium constant (or solubility constant, the square brackets mean molar concentration (M, or mol/L), and curly brackets mean activity. Since the activity of a pure solid is equal to one, this expression reduces to the solubility product expression:

$$K_{sp} = [Ca^{2+}(aq)][CO_2^{2-}(aq)]$$

This expression says that an aqueous solution in equilibrium with (saturated with) solid calcium carbonate has concentrations of these two ions such that their product equals Ksp; for calcium carbonate Ksp=$3.8*10^{-9}$ measured at 25° C.

The higher solubility of magnesium carbonate also contributes to additional pressure build-up during the foaming process which is undesirable.

The phenolic foam of the present invention comprises a blowing agent containing an aliphatic hydrocarbon that provides favourable properties regarding ozone depletion and global warming potential.

The amount of acid catalyst is controlled, and an inorganic filler such as calcium carbonate is added to increase pH. The higher pH value of the foam ensures that metallic material in contact with the phenolic foam is at reduced risk of corrosion.

The phenolic foam retains favourable fire-performance characteristics, and has stable thermal insulation performance over extended time scale. Preferably less than 0.025 W/m·K (measured at a mean temperature of 10° C. and after 175 days conditioning at 70° C. followed by conditioning until stable weight at 23° C. and 50% R.H.).

The phenolic foam is used industrially as thermal insulation for construction materials.

The invention is not limited to the embodiments herein before described which may be varied in detail.

The invention claimed is:

1. A composition for forming, when foamed and cured, a phenolic foam product with a pH of 5 or more, a closed cell content of 90% or more, and an aged thermal conductivity of 0.025 W/m·K or less when measured at a mean temperature of 10° C. after heat aging for 175±5 days at 70±2° C. in accordance with the procedure specified in European Standard EN13166: 2001, Annex C, Section C.4.2.3, the composition comprising:
a phenolic resin,
a blowing agent,
an acid curing catalyst to initiate polymerization of the phenolic resin,
an inorganic filler,
a plasticiser and an organic modifier for co-reacting with the phenolic resin;
wherein
the blowing agent comprises at least one of butane, pentane, hexane, heptane and isomers thereof,
the inorganic filler consists of a metal hydroxide or metal carbonate with an Ionic Equilibrium Solubility (Ksp) less than $10^{-8}$ when measured at 25° C. and is present in an amount of from 1 to 20 parts by weight per 100 parts by weight of phenolic resin; and the plasticiser has a molecular structure containing both an ester backbone and a hydroxyl group.

2. The composition as claimed in claim 1 wherein the filler consists of a metal carbonate selected from calcium carbonate, barium carbonate, or zinc carbonate.

3. The composition as claimed in claim 1 wherein the filler consists of calcium carbonate.

4. The composition as claimed in claim 1 wherein the phenolic resin comprises phenol groups and aldehyde groups in a molar ratio of phenol groups to aldehyde groups in the range 1:1 to 1:3.

5. The composition as claimed in claim 1 wherein the phenolic resin comprises phenol groups and aldehyde groups in a molar ratio of phenol groups to aldehyde groups is from 1:5 to 2:3.

6. The composition as claimed in claim 1 wherein the phenolic resin has a weight average molecular weight of from 400 to 3,000.

7. The composition as claimed in claim 1 wherein the phenolic resin has a weight average molecular weight of from 700 to 2,000.

8. The composition as claimed in claim 1 wherein the blowing agent is present in an amount of 1 to 20 parts by weight per 100 parts by weight of phenolic resin.

9. The composition as claimed in claim 1 wherein the blowing agent comprises cyclopentane and at least one hydrocarbon of isobutene and isopentane.

10. The composition as claimed in claim 9 wherein the blowing agent comprises 75% or more of cyclopentane.

11. The composition as claimed in claim 9 wherein the blowing agent comprises 25% or less of at least one hydrocarbon of isobutene and isopentane.

12. The composition as claimed in claim 1 wherein the acid catalyst is present in an amount of 5 to 25 parts by weight per 100 parts by weight of phenolic resin.

13. The composition as claimed in claim 12 wherein the acid catalyst comprises at least one of benzenesulphonic acid, para-toluenesulphonic acid, xylenesulphonic, naphthalenesulphonic acid, ethylbenzenesulphonic acid and phenolsulphonic acid.

14. The composition as claimed in claim 1 wherein the plasticiser is present in an amount of 0.1 to 20 parts by weight per 100 parts by weight of phenolic resin.

15. The composition as claimed in claim 14 wherein the plasticiser comprises a polyester polyol that is the reaction product of a polybasic carboxylic acid selected from a dibasic to a tetrabasic carboxylic acid with a polyhydric alcohol selected from a dihydric to a pentahydric alcohol.

16. The composition as claimed in claim 15 wherein the polyester polyol has a number average molecular weight of 250 to 350 and a weight average molecular weight of 400 to 550.

17. The composition as claimed in claim 14 wherein the polybasic carboxylic acid used to synthesise the polyester polyol comprises at least one of phthalic acid, isophthalic acid, terephthalic acid, naphthalene-2,3-dicarboxylic acid, naphthalene-1,4-dicarboxylic acid, naphthalene-2,6-dicarboxylic acid.

18. The composition as claimed in claim 14 wherein the polybasic carboxylic acid used to synthesise the polyester polyol comprises one or more of phthalic acid, isophthalic acid, or terephthalic acid.

19. The composition as claimed in claim 14 wherein the polyhydric alcohol used to synthesis the polyester polyol comprises at least one of ethylene glycol, diethylene glycol, propylene glycol, dipropylene glycol, 1,4-butane diol, 1,5-pentane diol, 1,6-hexane diol, neopentyl glycol.

20. The composition as claimed in claim 19 wherein the polyhydric alcohol used to synthesise the polyester polyol comprises one or more of diethylene glycol, propylene glycol, dipropylene glycol, 1,4-butane diol.

21. The composition as claimed in claim 1 comprising a surfactant for the phenolic resin, and the surfactant is present in an amount of 1 to 6 parts by weight per 100 parts by weight of phenolic resin.

22. The composition as claimed in claim 21, wherein the surfactant is a castor oil-ethylene oxide adduct wherein more than 20 moles but less than 40 moles of ethylene oxide are added per 1 mole of castor oil.

23. The composition as claimed in claim 1 wherein the modifier comprises of 1 to 10 parts by weight of a compound having an amino group per 100 parts by weight of phenolic resin, wherein the amino group containing compound is selected from urea, dicyandiamide and melamine.

24. The composition as claimed in claim 1 wherein the density of the phenolic foam is from 10 to 100 $kg/m^3$.

25. The composition as claimed in claim 1 wherein the density of the phenolic foam is from 10 to 45 $kg/m^3$.

26. The composition as claimed in claim 1 having a limiting oxygen index of 30% or more.

27. The composition as claimed in claim 1 having a moisture uptake of less than 0.9 $kg/m^2$.

28. The composition as claimed in claim 1 having a moisture uptake of less than 0.8 $kg/m^2$.

29. The composition as claimed in claim 1 wherein the phenolic foam has a facing on at least one surface thereof, wherein the facing comprises at least one of glass fibre-non woven fabric, spun bonded-non woven fabric, aluminium foil, bonded-non woven fabric, metal sheet, metal foil, ply wood, calcium silicate-board, plaster board, Kraft or other paper product, and wooden board.

* * * * *